United States Patent

O'Connor

[15] 3,665,411

[45] May 23, 1972

[54] COMPUTER

[72] Inventor: Daniel G. O'Connor, Endwell, N.Y.

[73] Assignee: The Singer Company, New York, N.Y.

[22] Filed: June 8, 1970

[21] Appl. No.: 44,249

[52] U.S. Cl. ....340/172.5
[51] Int. Cl. ....G06f 7/38
[58] Field of Search ....340/172.5

[56] References Cited

UNITED STATES PATENTS

| | | | |
|---|---|---|---|
| 3,477,063 | 11/1969 | Anderson et al. | 340/172.5 |
| 3,067,406 | 12/1962 | Southard | 340/172.5 |
| 2,978,175 | 4/1961 | Newman et al. | 340/172.5 X |
| 3,112,394 | 11/1963 | Close et al. | 340/172.5 X |
| 3,292,155 | 12/1966 | Nellson | 340/172.5 |
| 3,477,064 | 11/1969 | Hilgendorf et al. | 340/172.5 |
| 3,478,322 | 11/1969 | Evans | 340/172.5 |
| 3,297,998 | 1/1967 | Klein | 340/172.5 |

*Primary Examiner*—Paul J. Henon
*Assistant Examiner*—Ronald F. Chapuran
*Attorney*—Francis L. Masselle, William Grobman and Charles S. McGuire

[57] ABSTRACT

In normal digital computer operation each operation which is performed, normally requires a separate instruction. Time is required to obtain each instruction from storage and to decode each instruction. This invention comprises an improvement which provides means for performing several serial operations on several data words from different groups of words in response to a single instruction. This saves overall computer time, increases overall computer speed, and saves memory space.

6 Claims, 2 Drawing Figures

INVENTOR.
DANIEL G. O'CONNOR
BY
William Grobman

INVENTOR.
DANIEL G. O'CONNOR
BY William Grolman

COMPUTER

This invention relates to computers, and more particularly to computer configurations which provide higher overall computer operating speed.

Normal digital computer operation involves fetching an instruction from memory, decoding that instruction, and performing the operation specified therein. The fetching of each instruction from memory takes computer time. If the number of instructions required to carry out a computer program were reduced, the time required to carry out the program would be similarly reduced. Since the speed of operation of digital computers is one of their outstanding characteristics, any increase in computer speed is desirable.

In many digital computer utilizations there are often large numbers of similar operations to perform. For example, the multiplication for a large number of weekly employee hours by the same or different rates to derive the amount of each pay check is one type of such operation. Presently computers normally produce each particular product in response to a separate instruction. Thus, if 100 such operations are to be performed, the same instruction is fetched from memory 100 times. The average speed of operation of the computer as a whole can be increased if those 100 different operations were automatically performed in response to a single instruction. Since the fetching and decoding of an instruction normally occupies one cycle time, performing all operations in response to a single instruction would save 99 cycle times. Some of the more recent computers are designed to accomplish a similar time saving by the operations known as load multiple and store multiple. In these operations, which are useful only in those computers with a plurality of registers, a load multiple instruction fetches information from a plurality of memory locations sequentially in response to a single instruction, and stores that information in a plurality of registers in the computer. The store multiple instruction transfers the information stored in the plurality of registers into a plurality of memory locations. These operations are already accomplishing a savings in computer time.

It is an object of this invention to provide a new and improved digital computer system.

It is another object of this invention to provide a new and improved digital computer system having high operating speeds.

It is a further object of this invention to provide a new and improved digital system for performing a plurality of data manipulative functions in response to a single instruction.

Figure 1:
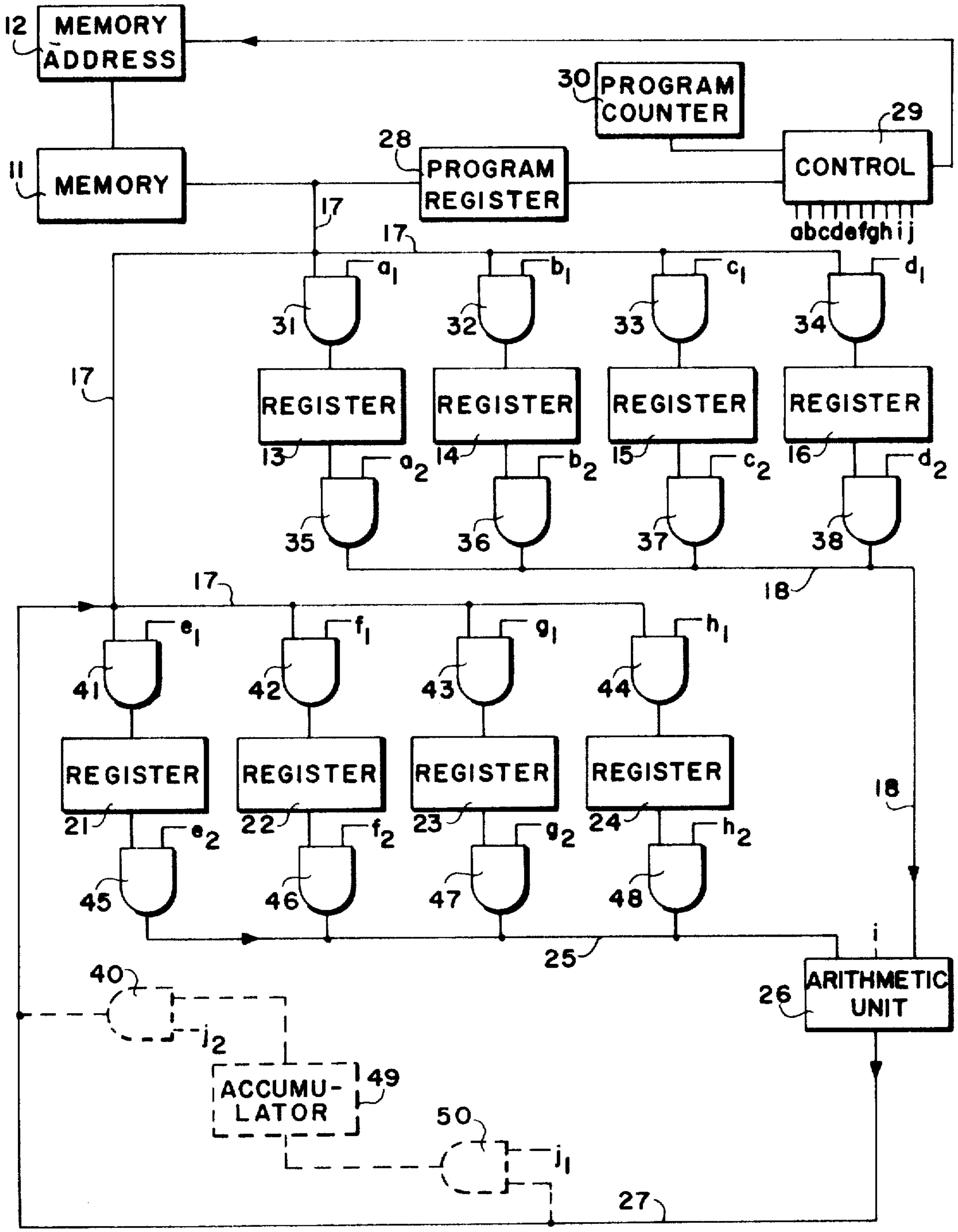
Figure 2:
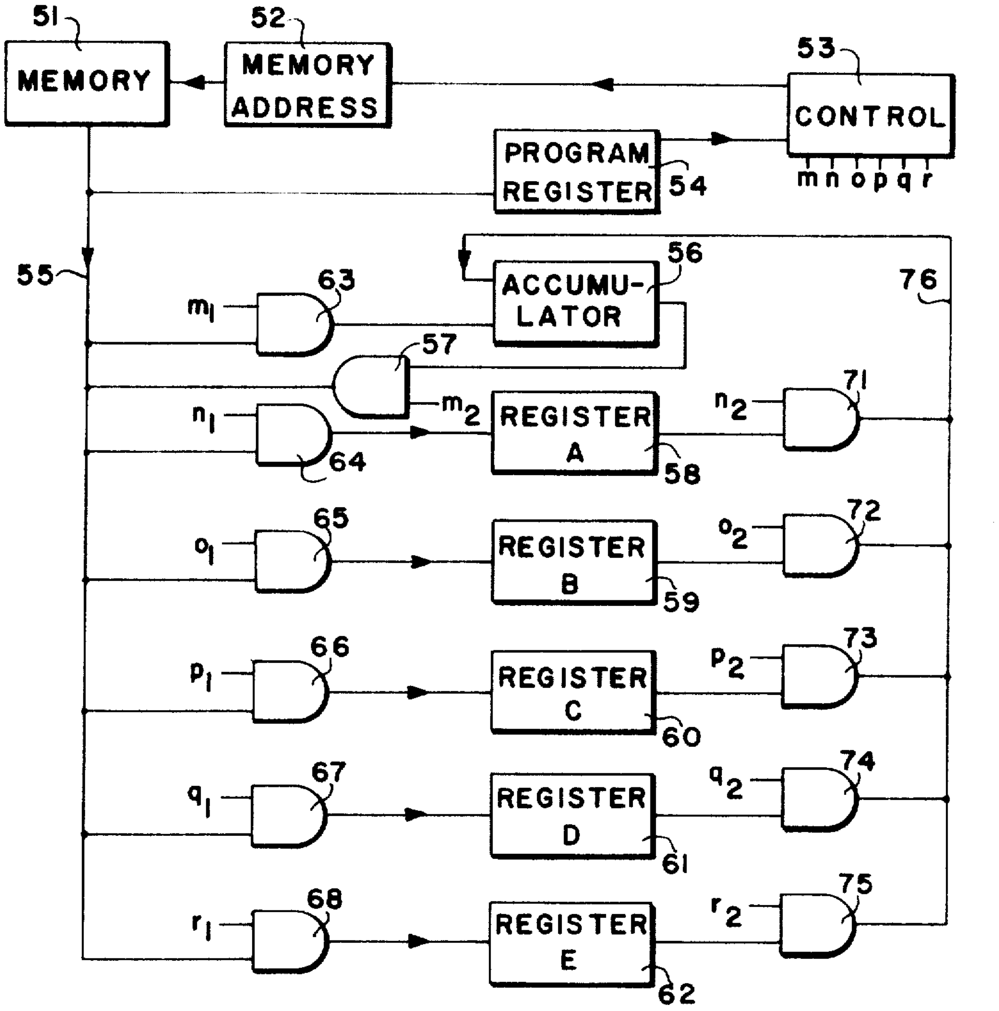

Other objects and advantages will become more apparent as the following description proceeds, which description should be considered with the accompanying drawings in which:

FIG. 1 is an overall block diagram of a portion of a computer in accordance with the invention, and FIG. 2 is an overall block diagram of a second multiplication computer in accordance with this invention.

Referring now to the drawings in detail, and in particular to FIG. 1, the reference character 11 designates any convenient and suitable digital memory such as that provided by magnetic cores, disks, or the like. The memory 11 comprises a large number of addressable locations into each of which a single computer word may be stored. Access to the memory 11 and to the individual locations therein for both storage and recovery of information is accomplished by a memory addressing circuit 12 which receives its stimulus from the output of control circuits 29. The output of the memory 11 is connected through a line 17 to the input of a program register 28 which stores the instruction and whose output is applied to the input of the control circuits 29. The line 17 also feeds the inputs to two banks of registers of which the first bank comprises registers 13, 14, 15, and 16, and the second bank comprises registers 21, 22, 23, and 24, in this example. It should be understood that each bank of registers could comprise any suitable number of registers, and in fact, in most present-day computers each bank may comprise up to 16 such registers. Each of registers 13–16 and 21–24 is a single word register. That is, each register is sufficiently large to store a single computer word. The input of register 13 is connected to the line 17 through a control gate 31, and its output is connected to an output line 18 through a control gate 35. In a similar manner register 14 has its input connected to line 13 through a gate 32 and its output connected to line 18 through a gate 36; register 15 has its input connected to line 17 through a gate 33 and its output connected to line 18 through a gate 37; and register 16 has its input connected to line 17 through a gate 34 and its output connected to line 18 through a gate 38. Each of the gates 31–38 is provided with its own control signal from the control circuits 29. Those control signals having a subscript 1 control the input gates and those having a subscript 2 control the output gates. The control signals for controlling register 13 are labeled $a_1$ and $a_2$, for register 14 are $b_1$ and $b_2$, for register 15 are $c_1$ and $c_2$, and for register 16 are $d_1$ and $d_2$. The control circuit 29 is shown having a plurality of output lines labeled a–j. For simplicity and to avoid undue clutter on the drawing, a single output line from the control circuits 29 is designated by the pair of control signals from the control register and none of these lines is shown connected. Thus, the output designated $a$ is actually a pair of lines, one of which is connected to gate 31 for signal $a_1$ and the other of which is connected to gate 35 for signal $a_2$. The second bank of registers 21–24 are connected to the input line 17 and to a second output line 25 in a similar manner. The output register 21 is connected to line 17 through a gate 41 and its output is connected to line 25 through a gate 45; the input to register 22 is connected from line 17 through a gate 42 and its output is connected to line 25 through a gate 46; the input to register 23 is connected to line 17 through a gate 43 and its output is connected to line 25 through a gate 47; and the input to register 24 is connected to line 17 through a gate 44 and its output is connected to line 25 through a gate 48. The control signals for the register 21–24 are designated, respectively, $e, f, g$, and $h$, with the input control signals having the subscript 1 and the output control signals having the subscript 2. The two output lines 18 and 25 serve as inputs to an arithmetic unit 26 whose output 27 is connected back into line 17.

In operation, the computer of FIG. 1 will perform multiple instructions, that is, a plurality of similar operations upon the stimulus of a single instruction. The program counter 30 maintains a record of the memory location of the next instruction to be performed, and counters are included in the control unit 29 which retain a record of the number of items of data to be withdrawn from memory and a record of the address of the next word to be withdrawn for each list. The output from the program counter 30 is applied to the control circuits 29 and is utilized in generating the information necessary to instruct the memory address network 12 where and when to fetch the next instruction from memory 11. The instruction derived from the memory 11 is stored in the program register 28, and it is decoded by the control circuits 29. In performing a multiple operation, the first instruction must transfer information from a plurality of memory locations in the memory 11 to the inputs of the first bank of registers 13, 14, 15, and 16. The second instruction will transfer information from a plurality of locations in memory 11 to the second bank of registers 21, 22, 23, and 24. Once information is stored in the two banks of registers, a third instruction can automatically cause a sequence of events to take place. For example, a single instruction could result in the contents of register 13 being added to the contents of register 21 with the total stored in the register 13; then the contents of register 14 added to the contents of register 22 with the total stored in register 14; then the contents of register 15 added to the contents of register 23 with the total stored in register 15; and the contents of register 16 added to the contents in register 24 with the total stored in register 16—all as a result of a single instruction. To accomplish this type of multiple addition, the instruction which is contained in the program register 28 must be decoded by the control circuits 29 to open gates 31, 35, and 45 simultaneously. When gates 35 and 45 are opened, the contents of the registers 13 and 21 are simultaneously applied from the output lines 18 and 25 to the inputs of the arithmetic unit 36. The output of the arithmetic unit, the sum of the registers 13 and 21, is then applied through the lines 27 and 17 and through the gate 31 to the register 13 so that the register 13 now contains the sum. After each cycle the control circuits 29 must switch their enabling signals from gates 31, 35, and 45 to gates 32, 36, and 46; then the gates 33, 37, and 47; and then to gates 34, 44, and 48.

What has been described is one form of a multiple add operation. If a multiple multiply operation were to be carried out in a manner similar to the multiple add operation described above, the control circuits 29 would either have to be provided with a special multiply subroutine or the computer would have to be internally programmed with a multiply instruction and so arranged that the separate steps of the multiply instruction would be automatically carried out in sequence. Since this is normal computer operation, the details need not be described here. The double-length word which results from a single multiply operation could be stored automatically in the two registers from which the two operands were taken. If the arithmetic unit 26 were instructed to carry out a multiplication operation automatically upon proper stimulation, a separate control signal could be applied thereto from the control circuits 29. Such a control signal is shown in FIG. 1 as the signal *i*. Thus, with the system shown in FIG. 1, multiple operations can be carried out upon the stimulation of a single instruction, saving the time required to fetch that instruction each time that one of those multiple operation is performed. In a situation where many such multiple operations are to be performed, the amount of time saved by not having to fetch a plurality of instruction can amount to a substantial increase in the overall speed of the computer.

FIG. 1 shows, in dashed lines, an accumulator 49, the input to which is connected to the line 27 which is the output from the arithmetic unit 26, through a gate 50. The output of the accumulator 49 is applied to the line 27 through a gate 50. Gates 50 and 40 are controlled by signals $j_1$ and $j_2$ from the control unit 29. The accumulator 49 together with its associated gates 40 and 50, shown in dashed lines, has collateral or auxillary functions which can be used with the apparatus of FIG. 1. It is often desirable to accumulate the sum of the products of two series of numbers. Thus, assume, as a first series of numbers, quantities $A_1$, $A_2$, $A_3$, etc., and, as a second series of numbers, quantities $B_1$, $B_2$, $B_3$, etc., such a final result would be $A_1B_1 + A_2B_2 + A_3B_3 \ldots$. In the apparatus shown in FIG. 1, $A_1$ is inserted in register 13, $A_2$ is inserted in register 14, $A_3$ is inserted in register 13, and $A_4$ is inserted in register 16. Similarly, $B_1$ is inserted in register 21, $B_2$ is inserted in register 22, $B_3$ is inserted in register 23, and $B_4$ is inserted in register 24. The arithmetic unit 26 is programmed to carry out a multiplication. Then, in accordance with this invention, the multiple instruction is applied to the control unit 29 which generates the appropriate signal to cause the contents of the register 16 to be multiplied by the contents of the register 21 and the product to be stored in the accumulator 49. The same instruction will cause the contents of register 14 to be multiplied by the contents of register 22 and the product to be applied to the accumulator 49 wherein the product of the contents of registers 14 and 22 is added to the product of the contents of registers 13 and 21. In a similar manner the equipment operates to automatically multiply the contents of the register 15 by the contents of the register 23 and to accumulate the resulting product in the accumulator 49 with the two previously obtained products, and to multiply the contents of register 16 with the contents of register 24 and apply that resulting product to the sum which is accumulated in the assumulator 49. The result is represented by the following equation.

$$A_1B_1 + A_1B_1 + A_1B_1 + A_1B_1 = S$$

where S is the final sum. This type of operation is very common in a situation where different employees work different hours at different rates to contribute to the total cost of producing a single article of manufacture. In the situation where the costs are to be accumulated, a multiple multiplication, the products of which are, at the same time, accumulated to produce a total in response to a single instruction, can be a very valuable tool which adds to the overall speed of the computer operation and reduces the cost of computation.

FIG. 2 shows a computer which will perform multiple arithmetic operations somewhat differently than they were performed in the system of FIG. 1. A memory 51 has its output applied to a line 55 and also to the input of a program register 54 whose output is connected to an input of the control circuits 53. The computer, in this case, also contains a plurality of registers 58, 59, 60, 61, and 62 and an accumulator 56. The input to the accumulator 56 from the bus 55 is through a control gate 63 which has a second input $m_1$ from the control circuits 53. The input to register 58 from the bus 55 is through a gate 64 which has a second input $n_1$. The input to the register 59 is from the bus 55 through a gate 65 which has a second input signal $o_1$. The input to register 60 from the bus 55 is through an input gate 66 which has a second input signal $p_1$; the input to the register 61 from the bus 55 is through a gate 67 which has a second input $q_1$; and the input to register 62 from the bus 55 is through a gate 68 which has a second input signal $r_1$. The output of the register 58 is through a gate 71, the output of the register 59 is through a gate 72, the output of the register 60 is through a gate 73, the output of the register 61 is through a gate 74, and the output of the register 62 is through a gate 75, all to an output line 76. Each of the gates 71, 72, 73, 74, and 75 has a second input to the accumulator 56 and the output of the accumulator 56 is through a gate 76 to the line 55.

The apparatus of FIG. 2 is designed to perform a more common multiple function than that of FIG. 1. In the operation of FIG. 2 a single quantity is added in sequence to the contents of several individual registers with the sums being stored in the respective registers. Since a single quantity is added to several others, the apparatus required in FIG. 2 is somewhat less complex than the apparatus required in FIG. 1. In FIG. 2, an instruction is recovered from memory 51 and is stored in the program register 54. That instruction is decoded by the control circuits 53 to produce output signals for transferring information from a block of memory locations into registers 58–62. To accomplish that, the contents of the several memory locations are individually transferred from memory in sequence to the line. The gates 64–68 are individually opened in sequence so that the information contained in one memory location finds only a single gate open and is entered into only one of the registers 64–68. Once information is stored in the registers 64–68, a second instruction can transfer information from memory through the gate 63 into the accumulator 68. The next instruction is an add instruction and operates to cause the contents of the accumulator 65 to be added, in sequence, to the contents of the registers 64–68. This is accomplished by causing the control circuits 53 to apply signals in sequence to the gates *m* and *n–r*. Thus, for each addition cycle the gates m are open and the gates, say n, of a single register are also open. The information contained in the register 58 passes through the gate 71 into one input of the accumulator 56 where it is added to the contents of the accumulator, and the sum is transferred through the gate $m_2$ and the gate $n_1$ to the register 58. When that addition has been accomplished, the gates o are energized and the same sequence of events takes place with the contents of register 59. Once the entire instruction has been accomplished, the registers 58–62 contain the various sums. In the example of FIG. 1, five additions were accomplished with a single instruction saving the time for fetching and decoding four instructions.

Appropriately modified, the system of FIG. 2 could just as well carry out multiple subtraction, multiplication, or division operations, assuming that the system contained either a subroutine for accomplishing these operations or that the decoding of an instruction automatically set into operation the sequence of events which form the multiple event operations. For subtraction, one input to the accumulator 56 could readily contain a by-passed complementer so that for subtraction the information was passed through the complementer whereas for addition the information by-passed the complementer. In the case of multiplication, if the multiplier were contained in the accumulator and the multiplicand contained in the individual registers 58–62, then each multiplicand could be added to itself as many times as required by the multiplier. However, only single register precision is possible in FIG. 2 whereas double-register precision is possible with the apparatus shown in FIG. 1. Division can be accomplished in any manner normally performed by digital computers.

The systems described above in connection with FIGS. 1 and 2 show separate, independent registers for the storage of each information word which is to enter into a process. This is for clarity and convenience of description. Actually, any available and convenient information storage means can be used. These would include separate registers, individual contiguous memory locations, separate portions of multiword registers, and the like. If contiguous locations in memory are used, then one buffer register would be required to store one quantity, say $A_1$, while the second quantity, say $B_1$, was being fetched from memory. In this arrangement, additional time is saved since the information in memory need not be separately transferred to other registers before the sequential operation or process is initiated. In any case, the computer of this invention is not limited in the type of register used.

The systems shown and described above illustrate two ways in which multiple register digital computers can be designed to perform multiple arithmetic operations in response to a single instruction. Whenever this type of operation is feasible, the time for fetching and decoding a number of instructions is saved by having all of the operations performed in response to a single instruction. Since this saves time, the overall operational speed of the computer is increased with the attendant advantages due to such increased speed. It is understood that the above description may indicate to those in the digital computer field other ways in which the principles of this invention may be used without departing from its spirit. It is, therefore, intended that this invention be limited only by the scope of the amended claims.

What is claimed is:

1. A computer for performing a plurality of arithmetic operations including combinations of addition and multiplication in response to a single instruction, said computer comprising a data processing unit for performing multiplication, a plurality of individual data storage means, means for supplying individual data words to each of said data storage means, means for connecting said data storage means to said processing unit, means for accumulating the product output from said processing unit, and means responsive to a single command for causing a plurality of sequential transfers of data words from groups of said data storage means to said processing unit for processing and from said processing unit to said accumulator.

2. The computer defined in claim 1 wherein said command responsive means comprises a control unit which receives an instruction and generates the signals required to cause said processing unit to process information supplied thereto.

3. A computer comprising a plurality of registers for temporarily storing information, a processing unit for performing multiplication, means for connecting said registers individually to said processing unit for the transfer of information therebetween, a control unit for translating individual instructions into signals for causing a plurality of transfers of information from groups of registers in sequence to said processing unit and the processing of information presented to said processing unit at any time, an accumulator connected to accumulate the outputs from said processing unit during an individual instruction, and means for supplying single instructions to said control unit.

4. The computer defined in claim 3 wherein said registers are each a one-word register, and wherein information is transferred from two of said registers at one time to said processing unit for processing.

5. The computer defined in claim 3 wherein said plurality of registers comprise two banks of registers and wherein the information applied to one bank of registers comprises a first series and the information applied to the second bank of registers comprises a second series, and wherein said processing unit processes the information from each pair of registers in sequence.

6. A computer comprising apparatus for performing a plurality of arithmetic operations in response to a single instruction, said apparatus comprising a plurality of registers arranged in pairs, means for applying to each of said registers a data word, a data processor having at least two inputs and an output capable of multiplying two data words and producing the product thereof, means for connecting the outputs of each of the registers to an input of said processor so that pairs of data words appear at the inputs to the processor at the same time, an accumulator connected to the output of said processor to accumulate the products produced thereby, a control unit responsive to individual instructions to cause pairs of data words to be transferred to the inputs of said processor in sequence so that one is multiplied by another and to cause the results of said multiplication to be transferred to said accumulator, and means for applying individual instructions to said control unit.

* * * * *